(12) United States Patent
Finne et al.

(10) Patent No.: US 8,380,710 B1
(45) Date of Patent: Feb. 19, 2013

(54) ORDERING OF RANKED DOCUMENTS

(75) Inventors: Chrix Finne, San Francisco, CA (US); Benjamin Darnell, Palo Alto, CA (US); Gaurav Jain, San Francisco, CA (US)

(73) Assignee: Google Inc., Mountain View, CA (US)

( * ) Notice: Subject to any disclaimer, the term of this patent is extended or adjusted under 35 U.S.C. 154(b) by 328 days.

(21) Appl. No.: 12/688,204

(22) Filed: Jan. 15, 2010
(Under 37 CFR 1.47)

Related U.S. Application Data

(60) Provisional application No. 61/223,228, filed on Jul. 6, 2009.

(51) Int. Cl.
*G06F 17/30* (2006.01)
(52) U.S. Cl. ....................................... 707/723
(58) Field of Classification Search ............... 707/723, 707/725
See application file for complete search history.

(56) References Cited

U.S. PATENT DOCUMENTS

| | | | | |
|---|---|---|---|---|
| 5,689,484 | A * | 11/1997 | Hirasawa .................. | 369/30.3 |
| 2007/0043761 | A1* | 2/2007 | Chim et al. ................ | 707/102 |
| 2007/0162432 | A1* | 7/2007 | Armstrong et al. ........... | 707/3 |
| 2008/0208847 | A1* | 8/2008 | Moerchen et al. ............ | 707/5 |
| 2009/0070301 | A1* | 3/2009 | McLean et al. ............. | 707/3 |
| 2009/0070346 | A1* | 3/2009 | Savona et al. ............. | 707/100 |

OTHER PUBLICATIONS

Google Reader <http://web.archive.org/web/20071021074431/http://en.wikipedia.org/wiki/Google_Reader>, Oct. 21, 2007 (retrieved Jan. 15, 2010), 4 pages.

Google Groups <http://web.archive.org/web/20080227232449/http://en.wikipedia.org/wiki/Google_Groups>, Feb. 27, 2008 (retrieved Jan. 15, 2010), 6 pages.

iGoogle <http://web.archive.org/web/20080227152052/http://en.wikipedia.org/wiki/IGoogle>, Feb. 27, 2008 (retrieved Jan. 15, 2010), 3 pages.

My Yahoo!—Featuring RSS <http://web.archive.org/web/20071015224855/http://my.yahoo.com/s/about/rss/index.html>, Oct. 15, 2007 (retrieved Jan. 15, 2010), 2 pages.

Bloglines—About Bloglines <http://web.archive.org/web/20080822212820/www.bloglines.com/about>, Aug. 22, 2008 (retrieved Jan. 15, 2010), 2 pages.

\* cited by examiner

*Primary Examiner* — Charles Kim
*Assistant Examiner* — Grace Park
(74) *Attorney, Agent, or Firm* — Fish & Richardson P.C.

(57) ABSTRACT

Methods, systems, and apparatus, including computer programs encoded on computer storage media, for distributing and presenting of electronic content. One method provides an enhanced ordering of ranked documents, in which one or more lists of documents that have been published in a web feed, a time that each document was published in the web feed, and a content-based ranking of a ranked subset of the documents are obtained, the documents collectively including ranked documents which are members of the ranked subset of the documents, and unranked documents which are not members of the ranked subset of the documents. Furthermore, a user interface is provided which displays links to a plurality of the ranked documents, ordered according to the content-based ranking, and which simultaneously displays links to a plurality of the unranked documents, ordered chronologically based on the time that each respective document was published in the web feed.

16 Claims, 6 Drawing Sheets

ORDERING OF RANKED DOCUMENTS

CROSS-REFERENCE TO RELATED APPLICATION

This application claims the benefit of U.S. Provisional Patent Application No. 61/223,228, filed Jul. 6, 2009, which is incorporated herein by reference.

BACKGROUND

This specification relates to the distribution and presentation of electronic content.

A web feed (or 'news feed') is a format for delivering frequently updated web content to users. In a typical scenario, a feed publication site publishes a feed link which a user may register with his or her feed reader. The feed reader periodically queries or checks the feed publication site to determine whether new content has been published and, if so, the new content (or a link to the new content) is downloaded by the feed reader and displayed to the user.

SUMMARY

This specification describes technologies relating to the distribution and presentation of electronic content.

In general, one innovative aspect of the subject matter described in this specification can be embodied in methods that include the action of ranking certain documents that have been published in a web feed based on their content or merit. For example, documents that are currently being published in a web feed (which will be referred to as 'ranked documents') may be sorted or ordered based on a priority ranking assigned to the documents by the feed publication site. Alternatively, these documents may be sorted or ordered based on the extent to which the operator of the feed publication site, other past users, or third parties, have accessed, commented upon, or otherwise expressed their opinion of, or satisfaction with, this content.

In the case where the documents are ranked by a third party, the ranking can be provided explicitly, such as where the third party provides a data structure which assigns a rank or priority to each document, or the ranking can be provided implicitly, such as where the rank of the document is expressed in the order in which the documents are provided to the user. In either case, this specification describes techniques relating to 'high-fidelity' ordering, which is intended to describe ordering in which the links to the documents that are currently ranked by the third party are displayed by the feed reader according to that current ranking.

In addition to ranked documents, however, the web feed may also publish documents that have not been ranked, documents that were previously ranked but are no longer ranked, or documents that are no longer currently being published by the feed publication site (which will collectively be referred to as 'unranked documents'). This specification also describes techniques relating to 'hybrid high-fidelity' ordering, which is intended to describe ordering in which links to one or more of the ranked documents are displayed in one region of a user interface of a feed reader, at the same time as links to one or more of the unranked documents are displayed in another region of the user interface.

These and other embodiments can each optionally include one or more of the following features. The links to the ranked documents may be displayed above the links to the unranked documents. Furthermore, the links to the unranked documents may be ordered for display on the user interface in a different manner than the ranked documents are ordered, such as by chronologically ordering the unranked documents and ordering the ranked documents based on content or non-chronologically.

In general, another aspect of the subject matter described in this specification can be embodied in methods that include the actions of obtaining in a data processing apparatus one or more lists of documents that have been published in a web feed, a time that each document was published in the web feed, and a content-based ranking of a ranked subset of the documents, the documents collectively including ranked documents, ranked documents being documents which are members of the ranked subset of the documents, and unranked documents, unranked documents being documents which are not members of the ranked subset of the documents; and providing a user interface which displays links to a plurality of the ranked documents, ordered according to the content-based ranking, and which simultaneously displays links to a plurality of the unranked documents, ordered chronologically based on the time that each respective document was published in the web feed. Other embodiments of this aspect include corresponding systems, apparatus, and computer programs, configured to perform the actions of the methods, encoded on computer storage devices.

These and other embodiments can each optionally include one or more of the following features. For instance, the actions may include selecting, as the ranked subset of the documents, those documents encountered during a most recent check of the web feed, where obtaining the content-based ranking further includes storing, as the content-based ranking of the ranked subset of the documents, an editorial ranking as assigned to the ranked subset by a publisher of the web feed as presented at the most recent check. The links to ranked documents may be displayed above the links to the unranked documents. Links to all of the ranked documents may be displayed in the user interface, ordered according to the content-based ranking. Links to fewer than all of the ranked documents may be displayed in the user interface, ordered according to the content-based ranking, and links to the unranked documents may be displayed in the user interface, ordered chronologically based on the time that each respective document was published in the web feed.

A relevance score may be generated for each of the documents on the one or more lists, where obtaining the content-based ranking of the ranked subset of the documents may further include generating the content-based ranking of the documents on the one or more lists based on the relevance scores, and selecting, as the ranked subset of the documents, a top N of the documents from the content-based ranking of the documents, N being a positive integer. Obtaining the content-based ranking of the ranked subset of the documents may further include generating a content-based ranking of the documents on the one or more lists based on past user interactions with the documents, and selecting, as the ranked subset of the documents, a top N of the documents from the content-based ranking of the documents, N being a positive integer.

Generating the content-based ranking of the documents based on the past user interactions may further include generating the content based rankings based on a quantity of recommendations or a quantity of comments associated with the documents by past users, or based on ratings assigned to the documents by the past users. The actions may also include selecting, as first and second subsets of the documents, those documents encountered during a prior check and a most recent check of the web feed, respectively, determining a first editorial ranking and a second editorial ranking as assigned to the first and second subsets by the publisher of the web feed during the prior check and the most recent check of the web feed, respectively; and selecting, as the ranked subset of the documents, those documents whose editorial rank has increased between the first editorial ranking and the second editorial ranking, where obtaining the content-based ranking of the ranked subset of the documents may further include assigning, as the content-based ranking of the ranked subset of the documents, a ranking based on a degree to which the editorial rank has increased between the first editorial ranking and the second editorial ranking.

The actions may also include determining that documents encountered in a check of a web feed are not ranked in chronological order or reverse chronological order by a publisher of the web feed; and determining that the web feed is an editorially ranked web feed based on determining that the documents encountered in the check of a web feed are not ranked in chronological order or reverse chronological order, where the user interface which displays the links to the ranked documents and which simultaneously displays links to a plurality of the unranked documents may be provided based on determining that the web feed is an editorially ranked web feed. The one or more lists of documents may be stored by a search engine. The time that each document was published in the web feed may be the time that each document was first published in the web feed. The content-based ranking may be a non-chronological ranking. The user interface may display the links to the plurality of the ranked documents, ordered according to the content-based ranking, and may separately and simultaneously display the links to the plurality of the unranked documents, ordered chronologically based on the time that each respective document was published in the web feed.

In general, another aspect of the subject matter described in this specification can be embodied in a system that includes one or more computers; and a computer-readable medium coupled to the one or more computers having instructions stored thereon. When executed by the one or more computers, the instructions may cause the one or more computers to perform operations including obtaining one or more lists of documents that have been published in a web feed, a time that each document was published in the web feed, and a content-based ranking of a ranked subset of the documents, the documents collectively including ranked documents which are members of the ranked subset of the documents, and unranked documents which are not members of the ranked subset of the documents, and providing a user interface which displays links to a plurality of the ranked documents, ordered according to the content-based ranking, and which simultaneously displays links to a plurality of the unranked documents, ordered chronologically based on the time that each respective document was published in the web feed.

These and other embodiments can each optionally include one or more of the following features. For example, the one or more computers may include a client and a server, and providing the user interface may further include generating, by the client, the user interface using the one or more lists of the documents obtained by the client device from the server, or generating, by the server, data which, when transmitted over a network and invoked by the client, causes the client to generate the user interface, the server generating the code using the one or more lists of the documents obtained by the server, or generating, by the client, the user interface using the one or more lists of the document obtained by the server.

In general, another aspect of the subject matter described in this specification can be embodied in a computer storage medium encoded with a computer program. The program may include instructions that when executed by data processing apparatus cause the data processing apparatus to perform operations including obtaining one or more lists of documents that have been published in a web feed, a time that each document was published in the web feed, and a content-based ranking of a ranked subset of the documents, the documents collectively including ranked documents which are members of the ranked subset of the documents, and unranked documents which are not members of the ranked subset of the documents; and providing a user interface which displays links to a plurality of the ranked documents, ordered according to the content-based ranking, and which simultaneously displays links to a plurality of the unranked documents, ordered chronologically based on the time that each respective document was published in the web feed.

The details of one or more embodiments of the subject matter described in this specification are set forth in the accompanying drawings and the description, below. Other features, aspects and advantages of the subject matter will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
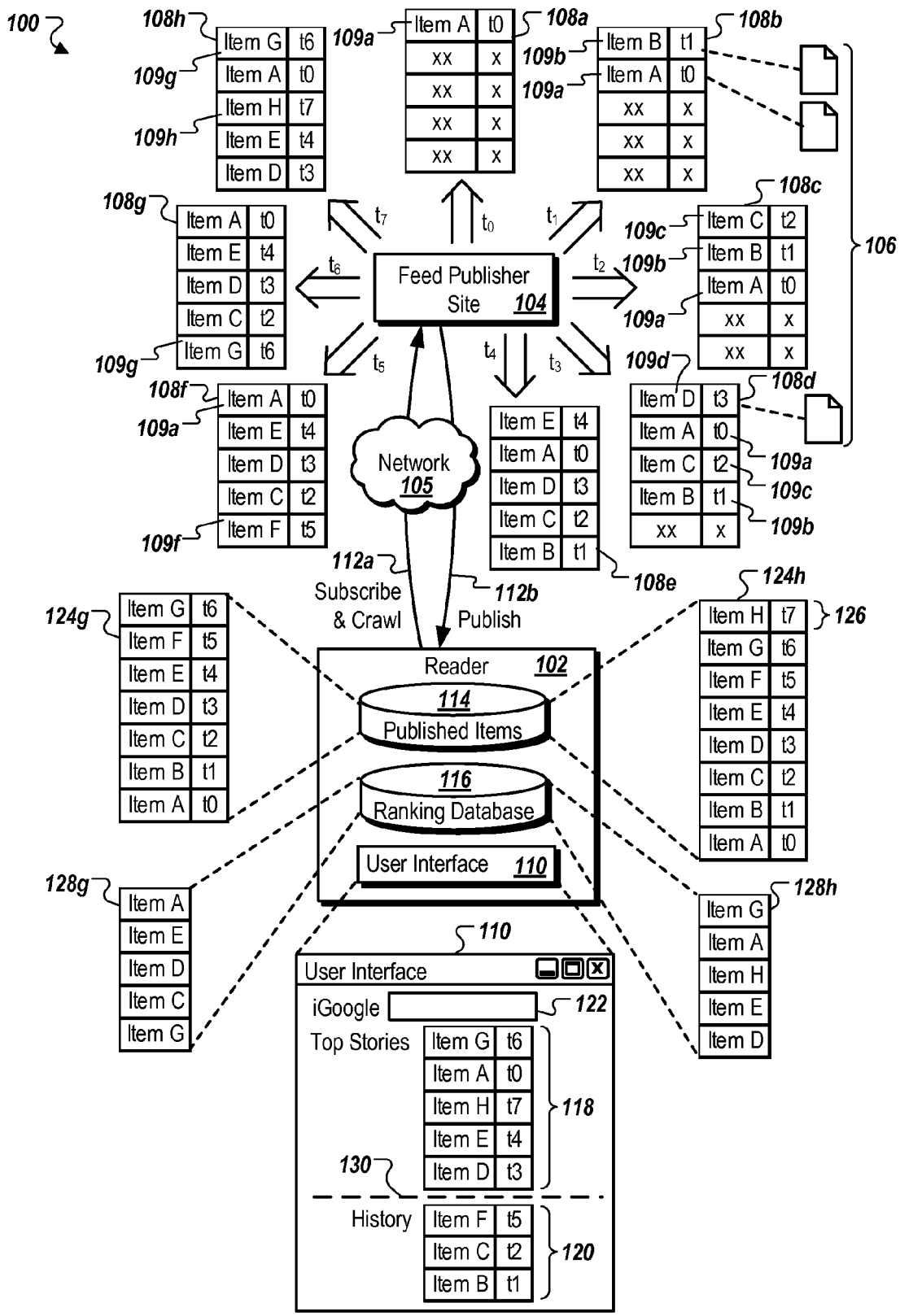
FIG. 1 is a contextual diagram illustrating an example ordering.

FIG. 1 illustrates an environment 100 in which documents or items published in a web feed are displayed using the hybrid high-fidelity ordering mode. The illustrated environment 100 includes a reader 102 and a feed publisher site 104. The reader 102 may be implemented on a client device or system, such as a laptop or desktop personal computer, personal digital assistant (PDA), or mobile phone. Alternatively, the reader 102 may be implemented on a server (such as a search engine) that generates code which, when transmitted over a network and invoked by a client, causes the client to generate a user interface which displays links to documents using the hybrid high-fidelity ordering mode. The environment 100 may be used, for example, to obtain one or more ranked or unranked lists of documents 106 that have been published in one or more web feeds, such as by the feed publisher site 104.

In FIG. 1, when the reader 102 checks a web feed published by the feed publisher site 104, the reader 102 may obtain, among other things, the content of (or a link to) each document, a time that each document was published or received (illustrated as times $t_0$, $t_1$, $t_2$, etc.), as well as the respective position within the web feed that each document was published. Timestamps may identify a date (e.g., year, month, day) and/or an absolute or relative time (e.g., hour, minute, second, fraction of a second, etc.) that each document was published or received.

When a document, or a link to a document, has been downloaded by the reader 102 and has been added to a published items database 114, links to the published documents may be ordered and displayed by the feed reader 102 using a variety of different approaches, including hybrid high-fidelity ordering. For instance, all documents on the list may simply be ordered chronologically based upon their associated publication or receipt timestamps, such that one or more of the most recent or oldest documents are displayed by the feed reader, or are provided by the feed reader for display on a client. Since chronological ordering is based upon the timestamp associated with each document and is not based on the content of the document identified by the feed publisher site 104, older documents which remain relevant or important may not be displayed in a chronologically ordered list.

This specification also describes techniques relating to 'editorial ordering,' which is intended to describe ordering of the documents based upon a ranking that is explicitly assigned to the documents by the feed publisher site 104. Editorial ordering is also referred to as 'publisher provided ordering,' and differs from other types of content-based ordering, which may be derived from relevance rankings provided by other readers or third parties, such as search engines, based on popularity. The techniques relating to editorial ordering do not require the involvement of a search engine.

At a given point in time, the feed publisher site 104 may publish a limited number of documents (e.g., 10 to 25), where each document is assigned a particular position or 'slot' within a web feed, based upon its relative priority. Technically, the web feed published by the feed publisher site 104 may actually be a structured list of documents and associated metadata, which is read periodically by the reader 102. As such, the a particular 'slot' of a document within a web feed may be determined based upon determining the position of a reference to the document within this structured list.

While many feed publication sites may use a first-in-first-out position assignment approach, where the oldest document in the current feed gets bumped from the last position of the web feed by the newest document being inserted into the first position of the web feed, other feed publication sites assign these web feed positions based on a priority of each document relative to the other documents in the web feed. Regardless of which approach the feed publisher site 104 uses, the reader 102 stores references to items which are no longer part of the feed (i.e., the unranked documents), as well as references to items which are currently still part of the feed (i.e., the ranked documents).

For instance, recalling that a publisher of web feed (e.g., Atom feed, Really Simple Syndication (RSS) feed, or feed in any other syndication format) limits the number of documents in their feed, the publisher may insert a recent document containing a low priority story into the last position of the web feed, instead of the first position. Conversely, the publisher may move an older document containing a story which has increased in relevance from the last position of the web feed to the first position of the web feed, instead of being displaced when a new story is inserted into the first or other position of the web feed. The position of each document within the web feed may thus be expressive of the priority that the operator of the feed publisher site 104 has subjectively assigned to the content of each document when placing it into the web feed.

When a feed reader downloads or checks the contents of a web feed, the feed reader may determine whether the feed publisher site 104 has applied an editorial ordering to the documents within the feed, or whether the documents are ordered chronologically by the feed publisher site 104. Specifically if, upon referencing the timestamps of each document, the reader 102 determines that the documents as positioned by the feed publisher site 104 are in chronological order, the reader 102 may assume that the feed publisher site 104 is positioning the documents in the web feed using chronological ordering or editorial ordering. Alternatively, if, upon referencing the timestamps of each document, the reader 102 determines that the documents as positioned by the feed publisher site 104 are not in chronological order, the reader 102 may assume that the feed publisher site 104 is positioning the documents using editorial ordering or content based ordering, and not chronological ordering. The feed reader may rank each document according to its respective position within the web feed (or 'editorial rank'), based on the assumption that this editorial rank is a subjectively assigned indicia of importance or priority of the documents.

In addition to displaying the documents in chronological order, the reader 102 may also order the documents on the user interface in a priority which corresponds to their editorial rank. In the high-fidelity' ordering mode, editorially ranked documents are ordered by the feed reader based on their position within the web feed as presented at the time of the last check. Since an editorially ranked web feed may continue to publish old stories for long periods of time or may quickly bump an unimportant new document from the web feed, a chronological listing of editorially ranked documents may be less relevant or valuable to the user than a high-fidelity ordering mode listing which reflects the prioritization of each document as assigned by the feed publisher site 104.

The documents that have been published in the web feed, including documents that are no longer being published, may include ranked documents and unranked documents. The ranked documents include those which are currently being published, and which may be ranked based on their content or merit. The unranked documents include those which were previously published but are no longer being published. In the hybrid high-fidelity ordering mode, the feed reader simultaneously displays links to one or more of the ranked documents in one region of the user interface, and links to one or more of the unranked documents in another, different region of the user interface. The links to the unranked documents may be ordered for display on the user interface in a different manner than links to the ranked documents are ordered.

Such a hybrid high-fidelity ordering mode may combine a historical or chronological display of certain documents from the web feed with an editorial ranking of other documents, providing benefits and advantages associated with each separate ordering approach for separate subsets of the documents. For example, one displayed subset of documents may be ranked based on relevance or content. Relevance based rankings may include publisher-provided rankings (i.e., editorial ordering), or other types of content-based ordering, such as reader-derived or search engine-derived relevance rankings. Ranking based on content or relevance is one type of non-chronological ranking, although other types of non-chronological rankings, such as random rankings, alphabetical rankings, or rankings by category or topic are also possible, with or without the involvement of a search engine.

Another subset of the documents may be displayed based on their chronological ranking, providing a historical log of documents which were published in the past but which are no longer considered most relevant by the feed publisher site 104 or by other readers or third parties, due to their low popularity. In this way, a user may easily navigate among the highest content-ranked documents, while still having access previously published documents regardless of their respective content-based ranking, and despite the fact that the previously published documents are no longer published.

The reader 102 and/or the feed publisher site 104 may store the history of the feed chronologically, adding new documents to the database of published documents as they are checked by the reader 102, and may also store the position of the documents within the feed at the time of the last check and/or previous checks. When documents from a web feed are displayed by the reader 102, some subset of those documents which have a high-fidelity ranking are displayed in their assigned order, and some subset of those documents which do not have a high-fidelity ranking are displayed in chronological order.

The reader 102 maintains a database which stores a content-based ranking (i.e. editorial ranking or relevance ranking) of the subset of the documents which are assigned a rank. The ranking may be based upon an editorial ranking of the documents, as assigned by an operator of the feed publisher site 104, or the ranking may be determined and assigned by the reader 102 itself or by another other entity, such as a search engine associated with the reader 102. The reader 102 may store or otherwise access various information about the documents, including information identifying documents which are members of the ranked subset of the documents and documents which are not members of the ranked subset, the order of the documents within the ranked subset, and the publisher's timestamp associated with the documents which are not members of the ranked subset. The timestamp may represent the time that the document was inserted into the web feed by the operator of the feed publisher site 104 or was last updated by the feed publisher site 104, or it may represent the first time that the document was seen by the reader 102 within the web feed.

A computer network 105, such as a local area network (LAN), wide area network (WAN), the Internet, or a combination thereof, communicatively connects the reader 102 and the feed publisher site 104. For example, through the network 105, the feed publisher site 104 provides the reader 102 with information, including lists of or references to published documents. When the reader 102 is implemented as a server, the network 105 may communicate with a client device over the computer network 105 as well.

Web feed tables 108a through 108h illustrate the relative positions of the documents within the web feed, as they are positioned and published by the feed publisher site 104 at times $t_0$ through $t_7$, respectively. As illustrated, the rows of the tables 108 identify a document and the time that each respective document was published in a web feed by the feed publisher site 104, or downloaded by the reader 102. The rows of each representative table 108 are ordered according to the ranking assigned to each document by the feed publisher site 104 (or the operator of the feed publisher). Where a document name is supplied (e.g., ITEM A, ITEM B, etc.) in a particular web feed table 108, the document name refers or links to a specific published document 106.

Web feed table 108a, for example, lists the order of documents stored by the reader 102 at time $t_0$, as ranked by the feed publisher site 104. Specifically, ITEM A 109a is ordered in the highest priority position of the web feed table 108a, since ITEM A 109a is, at time $t_0$, the only document that is published by the feed reader 104. ITEM B 109b refers to a document that was published at time $t_1$, ITEM C 109c refers to a document that was published at time $t_2$, ITEM D refers to a document that was published at time $t_3$, ITEM E refers to a document that was published at time $t_4$, ITEM F refers to a document that was published at time $t_5$, ITEM G refers to a document that was published at time $t_6$, and ITEM H refers to a document that was published at time $t_7$.

Thus, the web feed tables 108a through 108h appear clockwise in chronological order corresponding to publication times $t_0$ (for the web feed table 108a) through $t_7$ (for the web feed table 108h). The times $t_0$ through $t_7$ represent web feed publication times of documents 109 identified in the web feed tables 108, as updated by the feed publisher site 104 over time. The interval between these illustrated times (i.e. $(t_{n+1})-(t_n)$) may represent a uniform or non-uniform time interval.

The reader 102 includes a user interface 110 which displays links to at least a portion of the documents 106. A subset of the documents 106 which are ranked may be ordered sequentially according to their respective content-based rank, such as by using the editorial rankings assigned by the feed publisher site 104. Simultaneously, the user interface 110 may separately display links to the unranked documents, which may be ordered chronologically based on the time that each respective document was published in a particular web feed.

The links to the ranked documents may be displayed separately from the links to the unranked documents, or the links may be displayed together. When the links are displayed separately, they may be displayed in separate windows or the same window, they may or may not have a dividing element or border separating them, and they may or may not be displayed one-above-another or side-by-side. When the links are displayed together, they may be displayed in a single list, without interspersing the links to the ranked documents among the links to the unranked documents, or vice versa.

The current position of the published documents 106 within the web feed are reflected in the web feed table 108 associated with the time that the web feed was last visited by the reader 102. For example, the web feed table 108a represents an initial ordering of the published documents 106 within the web feed, showing ITEM A 109a in the highest priority position at $t_0$, with no other documents within the web feed. The web feed table 108b represents a subsequent ordering of the documents 106 at a later time ($t_1$) after ITEM B 109b has been inserted into the highest priority position of the web feed and published, as reflected by the positioning of ITEM B 109b in the web feed table 108b.

As such, the ITEM B 109b appears as a higher-ranked entry in the web feed table 108b than does the ITEM A 109a. The higher ranking may be the result of a news editor making a decision that the news information associated with ITEM B 109b is more newsworthy than that of the ITEM A 109a, or based upon a module of the feed publisher site 104 automatically determining that ITEM B 109b has received more comments than ITEM A 109a. As reflected in the table 108h associated with time $t_7$, as time elapses in this example, the items increasingly appear to be positioned out of chronological order by the feed publisher site 104.

The web feed tables 108c through 108h reflect the position of the published documents 106 within the web feed at times $t_2$ through $t_7$, respectively. For instance, the web feed table 108c includes a new ITEM C 109c inserted into the highest priority position of the web feed and published at time $t_2$; the web feed table 108d includes a new ITEM D 109d inserted into the highest priority position of the web feed and published at time $t_3$, as well as a re-positioning (or re-prioritization) of ITEM A 109a from the lowest priority position to the second highest priority position; and the web feed table 108e includes a new ITEM E 109e inserted into the second highest priority position an published at time $t_4$, as well as a re-positioning (or re-prioritization) of ITEM A 109a from the third highest priority position to the second highest priority position.

As shown by reference 112a, the reader 102 submits a subscription request to the feed publisher site 104 to subscribe to the web feed. This subscription, including, for example, user authentication information, may be stored by a subscription manager of the feed publisher site 104 and/or the reader 102. Once the reader 102 subscribes to the web feed, and as shown by reference 112*b*, new documents (or links to the new documents) are published when the reader 102 checks the web feed. From the point-of-view of the reader 102, the reader 102 determines that a new document is published when the new document appears in the feed that it is currently reading, although the publication timestamp of the new document may indicate a time earlier than when the reader 102 checked the feed publisher site 104. Thus, 'checking' the web feed occurs when the reader 102 periodically queries the feed publisher site 104 to determine whether new content has been published and, when it has, by downloading the new content to the reader 102. When published, one or more of published documents 106 are stored in a published items database 114 of the reader 102, in association with one or more old documents that are no longer published within the web feed.

As shown in table 124*g*, for example, the published items database 114 stores a list of the documents that the reader 102 has obtained from the web feed from time $t_0$ to time $t_6$, (specifically, ITEM A through ITEM G), and the publication or receipt timestamp associated with each obtained document. The information stored in table 124*g* includes references to all of the documents published in the web feed at time $t_6$ (specifically, ITEMS A, E, D, C, and G, as is also reflected in table 108*g*), as well as those items which were published in the web feed at time $t_0$ through time $t_5$ but which, for various reasons, were no longer being published in the web feed at time $t_6$ (specifically, ITEM B, published at time $t_1$ and removed at time $t_5$, and ITEM F, published at time $t_5$ and removed at time $t_6$). This information may be stored chronologically or non-chronologically within the table 124*g*.

In another example, and as shown in table 124*h*, the published items database 114 stores a list of the documents that the reader 102 has obtained from the web feed from time $t_0$ to time $t_7$, (specifically, ITEM A through ITEM H), and the publication or receipt timestamp associated with each obtained document. The information stored in table 124*h* includes links to all of the documents published in the web feed at time $t_7$ (specifically, ITEMS G, A, H, E, and D, as reflected in table 108*h*), as well as those items which were published in the web feed at time $t_0$ through time $t_6$ but which, for various reasons, were no longer being published in the web feed at time $t_7$ (specifically, ITEM B, published at time $t_1$ and removed at time $t_5$; ITEM F, published at time $t_5$ and removed at time $t_6$; and ITEM C, published at time $t_2$ and removed at time $t_7$). This information may be stored chronologically or non-chronologically within the table 124*h*.

The reader 102 also includes a ranking database 116 which stores current and/or past rankings of the documents that have been published by the feed reader 104. For instance, the ranking database 116 may include one or more tables which store the editorial ranking (or another content-based ranking) as assigned to the documents by the feed publisher site 104 at the time of the latest check, or at the time of prior checks.

Where the rankings are not explicitly provided in the web feed, the ranking database 116 may receive these rankings from a ranking generator which automatically generates the rankings based on information derived from the feed publisher site 104, the user or other past users, or other applications. The ranking generator may, for example, generate a ranking based upon ratings or comments applied to the documents by other past users in the past, and may filtering out ratings or comments that the ranking generator determines may be an undesired or unsolicited bulk message ('spam').

As shown in table 128*g*, for example, the ranking database 116 stores a table or list, representing a 'snapshot' of the documents that the reader 102 has obtained from the web feed at time $t_6$, as ranked by the feed publisher site 104 at time $t_6$. Notably, the content of this table 128*g* (specifically, ITEMS A, E, D, C, and G, in order) matches the content of the table 108*g* (also ITEMS A, E, D, C, and G, in order), which reflects the positions of the documents within the web feed as assigned by the feed publisher site 104, and as read by the reader, at time $t_6$. In this example, the table 128*g* does not list any document which is not published by the feed publisher site 104, and as read by the reader, at time $t_6$ (such as ITEMS B, F, and H), since it is implied that these documents are no longer considered important or relevant by the feed publisher site 104, and they therefore no longer need to be prominently displayed through the user interface 110.

Although table 108*g* and table 128*g* (and, similarly, table 108*h* and table 128*h*) appear to be identical in FIG. 1, table 108*g* actually represents the structured document and associated metadata which is read periodically by the reader 102, while table 128*g* is an example of the table stored in the ranking database 116, representing a snapshot of the ranking received from the feed publisher site 104 at time $t_6$. Other ranking tables may also be stored in the ranking database 116. These other ranking tables may be copies of information which is received from the feed publisher site 104, or they may store rankings that are generated (by the reader 102 or by third parties) based on an analysis of the content of the published items stored in the published items database 114.

In another example, and as shown in table 128*h*, the ranking database 116 stores a table or list of the documents that the feed reader 102 has obtained from the web feed at time $t_7$, as ranked by the feed publisher site 104 at time $t_7$. Notably, the content of this table 128*h* (specifically, ITEMS G, A, H, E and D, in order) matches the content of the table 108*h* (specifically, ITEMS G, A, H, E and D, in order), which reflects the positions of the documents within the web feed as assigned by the feed publisher site 104 at time $t_7$. In this example, the table 128*h* does not list any document which is not published by the feed publisher site 104 at time $t_7$ (such as ITEMS B, C, and F), since it is implied that these documents are no longer considered important or relevant by the feed publisher site 104, and they therefore no longer need to be prominently displayed through the user interface 110.

Alternatively, in some implementations the functionality of the published items database 114 and the ranking database 116 is combined, the feed reader 102 may store a single list or table which references all items that have been published within the web feed and received by the feed reader 102 through the last check, a timestamp for these items and, for those items which were published in the web feed as presented at the time of the last check (i.e., the 'ranked documents'), the position of those documents within the web feed. At the time of a new check of the web feed, the tables or lists stored in the published items database 114 and/or the ranking database 116 may be updated by adding a new table associated with the latest check time and by archiving or deleting prior tables, or they may be updated by revising a prior table or list with the most recent information. Accordingly, as a significant amount of time elapses, the ranking database 116 may include one list or table which includes the most current ranking information, or it may include many tables, only one of which includes the most current ranking information.

The reader 102 may use information associated with the documents in the published items database 114, such as timestamp information, and stored rankings for the documents from the ranking database 116 to determine a presentation order for the documents, and may present the documents in the determined order using the user interface 110.

When hybrid high-fidelity ordering is used, the user interface 110 includes a top stories area 118 which displays one or more of the ranked documents according to their editorial ranking, and a history area 120 which displays one or more of the unranked documents according to a chronological or reverse chronological order. In this manner, the user of the user interface 110 may view certain highly ranked documents, as well as older documents which might be relevant to the user but which are no longer published in the feed. Although the two separate areas are referred to in this example as a 'top stories' area and a 'history' area, in other implementations the separate areas may be referred to differently.

The top stories area 118 and the history area 120 may be separated by a dividing element (referred to as the 'fold') 130. In the example user interface 110, the links to ranked documents (e.g., in the top stories area 118) are displayed above the links to the unranked documents (e.g., in the history area 120), and are separated by a horizontal fold 130. In other implementations, the links may appear in other orders or in different visual arrangements (e.g., side-by-side with a vertical fold, etc.). In other implementations, no dividing element is used and, from the perspective of the user, the links to the ranked documents are indistinguishable from the links to the unranked documents.

By manipulating the position of the fold 130 on the user interface, the user may control the quantity of ranked documents and unranked documents to display. If, through the manipulation of the fold 130, a ranked document is removed from the top stories area 118, it may be displayed or animated to appear among the chronologically ordered documents in the history area 120 based upon its timestamp.

The ranking of the documents 106 within the web feed during the most recent check and the ranking of the documents 106 within the web feed during a prior web check may both be stored by the ranking database 116 in one or more tables or lists. By comparing both rankings, the reader 102 may identify new documents which were added to the web feed since the prior check, removed documents that were removed from the web feed since the prior check, and upward-moving and downward-moving documents whose relative position (and corresponding implicit priority) within the web feed increased or decreased since the prior check, respectively.

The reader 102 may display fewer than all of the ranked documents or fewer than all of the unranked documents in the user interface 110. The quantity of ranked or unranked documents to display may be predetermined, may be user selectable, or may be determined based upon the content of the documents within the web feed. For instance, by manipulating the position of the fold 130 on the user interface (e.g., by selecting and dragging the fold 130 with a mouse cursor), the user may control the number of ranked documents and unranked documents to display.

Furthermore, in selecting the subset of the ranked to display in top stories area 118 of the user interface 110, the reader 102 may consider or select all or some of the new documents, removed documents, or the upward-moving or down-moving documents. For upward-moving or downward-moving documents, the reader 102 may select documents for display above or below the fold 130 based upon the degree to which they moved upward or downward. For instance, the reader 102 may select a document for display above the fold if it moved upward more than a predetermined number or percentage of positions within the web feed, but may not display that same document above the fold if it moved fewer than the predetermined number or percentage of positions.

Taking this example one step further, the reader 102 may display the one document which has increased most in rank between the prior check and the most recent check above the fold, and may display all other documents in chronological order below the fold.

Although hybrid high-fidelity ordering may be used in each case, the selection of different subsets of ranked and unranked documents may dramatically alter the substance and general visual appearance or arrangement of the user interface 110. In addition to 'generic' hybrid high-fidelity ordering, the feed reader interface may provide a variety of discrete, separately selectable hybrid high-fidelity ordering modes that each use different subsets of ranked and unranked documents.

In some implementations, additional interface controls or elements may be displayed on the user interface 110 to allow the user to control the formatting and content of the display. For example, the user may use an interface control to switch display modes among, for example, a chronological ordering mode, a high fidelity ordering mode, or any number of hybrid high-fidelity ordering sub-modes. If the high fidelity ordering mode or the hybrid high-fidelity ordering mode are selected, the user may use the interface control to alter the basis for the content ranking, for example to indicate whether the documents should be ranked according to their editorial order, according to the quantity of comments received, according to the collective ranking, or according to other merit-based factors.

The user may also use an interface control to change a location of the fold 130, which may similarly alter the number of ranked documents or unranked documents, or the ratio of ranked documents to unranked documents, to display on the user interface 110. The user interface 110 may include other controls 122 (e.g., search boxes and other fields and controls) or other areas for displaying additional web feed information.

The reader 102 may use the information stored in the published items database 114 and the ranking database 116 to identify which documents to display in the user interface 110, and to select the presentation order of these identified documents. For example, the reader 102 may select one or more of the documents stored in the most recently updated table of the ranking database 116 (i.e. one or more of the ranked documents), and may display these ranked documents in the top stories area 118 of the user interface 110. Further, the reader 102 may select one or more of the documents stored in the most recently updated table of the published items database 114 which are not included in the most recently updated table of the ranking database 116 (i.e., one or more of the unranked documents), may order these unranked documents chronologically, and may display these unranked documents in the history area 120 of the user interface 110.

In some implementations, the chronological list of documents displayed in the history area 120 may also include documents that are also listed in the top stories area 118 (i.e., the ranked documents). In this case, the duplicated documents may be highlighted or otherwise specially marked, such as by using a different font or color, or by adding a special symbol adjacent to the link to the document. In other implementations, the duplicate documents are removed, so that the chronological list displays a single version or instance of the document.

The reader 102 is invoked using a system which may include one or more processors, input and output devices, network interfaces, and computer-readable storage mediums. The reader 102 may be invoked a client device, such as a desktop personal computer, which invokes a feed reader application which itself checks web feeds, stores lists of documents published in the web feeds, selects documents for display, orders the documents for presentation, and displays links to a plurality of the ordered documents. Alternatively, the reader 102 may be invoked on a combination of a client device and a server device, where the server device checks web feeds, stores lists of documents published in the web feeds, selects documents for display, orders the documents for presentation.

Furthermore, and among other applications stored on the one or more media, the reader 102 may include a web feed reader application which manages web feed subscriptions, performs checks of web feeds, and orders documents for presentation through the user interface 110; an internet browser application; a search engine application; and a comment or rating application which allows users to comment on or rate documents, and which filters out those comments or ratings that are determined to be likely spam.

Figure 2:
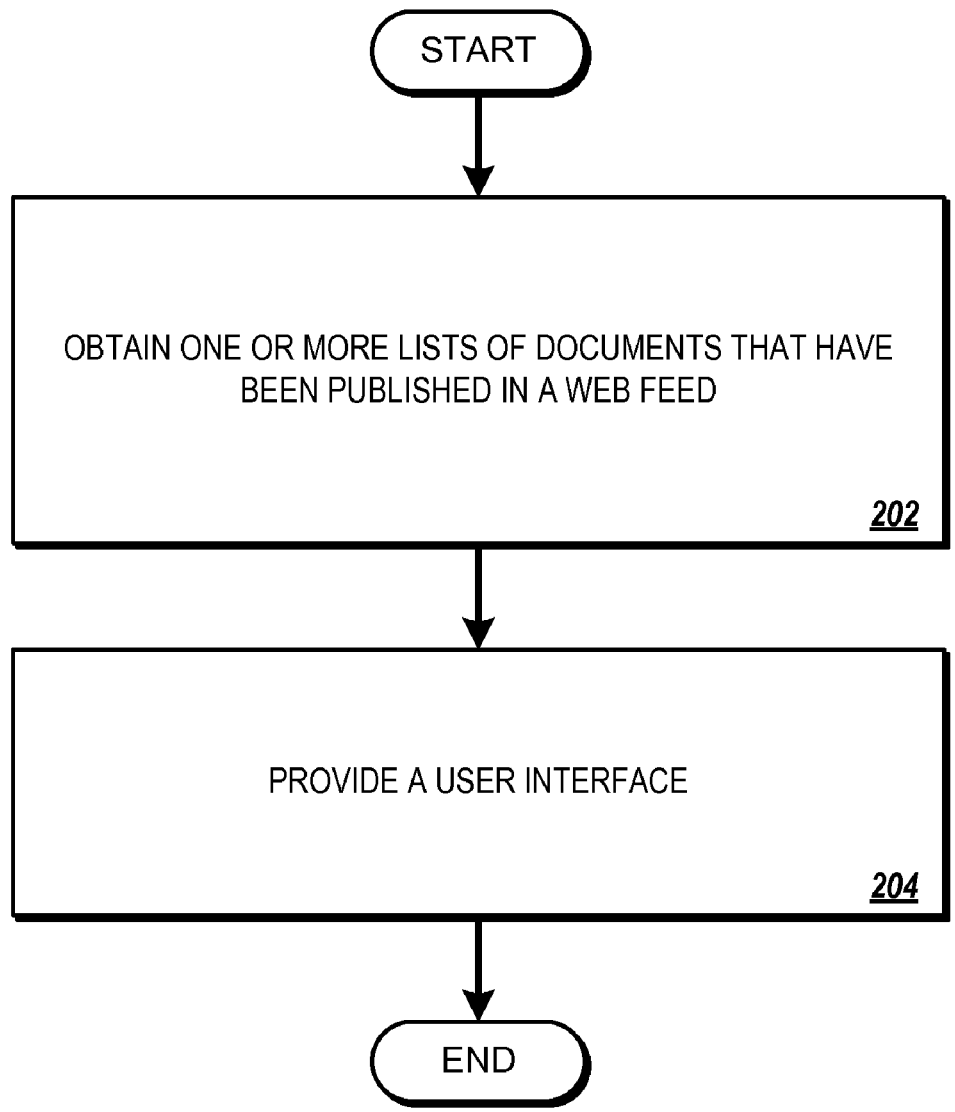
FIG. 2 is a flowchart of an example process.

FIG. 2 is a flowchart of an example process 200 for obtaining and displaying web feed documents in a hybrid high-fidelity ordering mode. The example process 200 may be used, for example, to display web feed documents used in the environment 100 described with respect to FIG. 1. The example process 200 may be implemented using one or more readers 102 and one or more feed publishers 104.

One or more lists of documents that have been published in a web feed are obtained (202), for example by a search engine. Also obtained is a time that each document was published in the web feed or checked by the feed reader, and a content-based ranking of a ranked subset of the documents. The documents collectively include ranked documents which are members of the ranked subset of the documents, and unranked documents which are not members of the ranked subset of the documents.

The ranked subset of the documents may include editorially ranked documents which were encountered by the feed reader during a most recent check, where the editorial ranking is stored as the content-based ranking of the documents. A relevance score may be generated for each of the documents on the one or more lists, where the content-based ranking may be generated based on the relevance scores. The relevance score may be based upon past interactions with the documents by other users in past sessions, where the interactions may include a quantity of recommendations or a quantity of comments associated with the documents by past users, or ratings assigned to the documents by the past users.

The editorial ranking of those documents encountered during a prior check, and during a most recent check of the web feed, may be identified, where the content-based rank may be assigned to each document based upon an extent to which each document increased in editorial rank between the prior check and the most recent check. Depending upon whether the document encountered in a check of the web feed are ranked in chronological order by the publisher of the web feed, the feed reader may determine that the web feed is an editorially ranked web feed or not an editorially ranked web feed, and may order the ranked documents for display accordingly.

A user interface is provided which displays links to a plurality of the ranked documents (204). The documents are ordered according to the content-based ranking, and which simultaneously displays links to a plurality of the unranked documents, ordered chronologically based on the time that each respective document was published in the web feed.

The links to some or all of the ranked documents may be displayed above the links to the unranked documents, where the ranked documents are ordered according to the content-based ranking. Links to the unranked documents may be displayed in the user interface, ordered chronologically based on the time that each respective document was published in the web feed.

Figure 3:
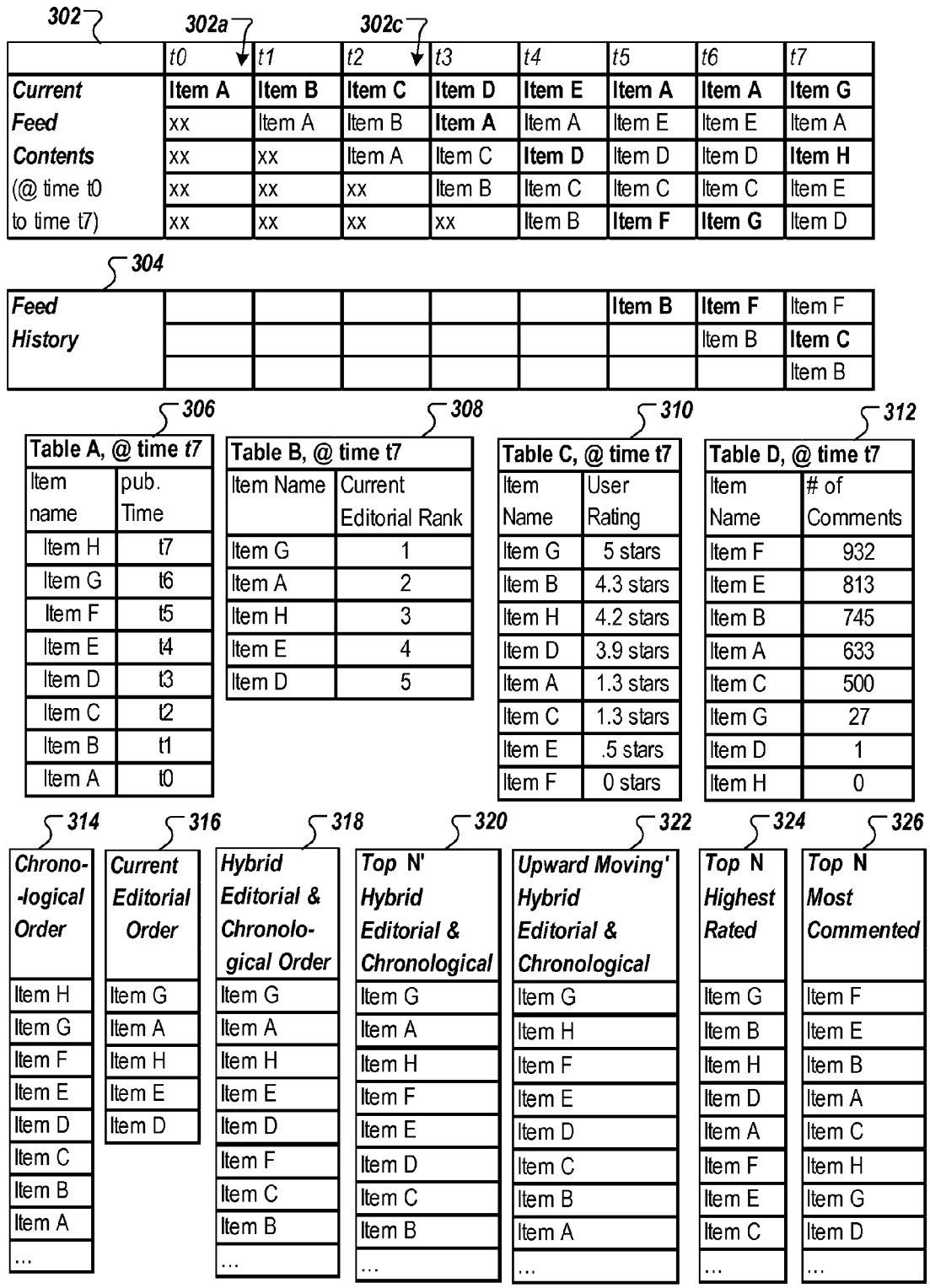
FIG. 3 illustrates the published content of an exemplary web feed in various states, and concomitant example rankings and orderings.

FIG. 3 illustrates the published content of an exemplary web feed in various states, and concomitant example rankings and orderings. Specifically, and similar to web feed tables 108a to 108h, the table 302 illustrates the position of various documents in an exemplary web feed at times $t_0$ to $t_7$. As shown in column 302a, for example, ITEM A is ordered in the highest priority position of the web feed, since ITEM A is, at time $t_0$, the only document that is published in the web feed. Column 302c shows that ITEM C was published at time $t_2$. For the exemplary web feed illustrated in table 302, the table 304 illustrates a historical list of unranked documents that were published in the web feed in the past, but which are no longer published or ranked.

Tables 306, 308, 310 and 312 are data tables stored by the feed reader at time $t_7$, reflecting the state of the exemplary web feed at time $t_7$. Table A 306, which is similar to table 124h, is stored in the published items database of the feed reader, and lists the documents that the feed reader has obtained from the web feed from time $t_0$ to time $t_7$. Table B 308, which is similar to table 128h, is stored in the ranking database of the feed reader, and lists the documents that the feed reader has obtained from the web feed at time $t_7$, as ranked by the feed publisher at time $t_7$.

Tables 310 and 312 are exemplary tables generated by a ranking generator of the feed reader based in part on past session data of other users. For instance, Table C 310 stores an example user rating-based ranking of the documents. For example, the user ratings shown in the table are 'stars' which may correspond to star or popularity ratings entered by past users, and processed by the ranking generator to remove false or spammy entries.

In this example, ITEM G is rated as having 5.0 stars, and is ranked in table C 310 higher than the next ITEM B which is rating as having 4.3 stars. ITEM F, which has no stars, is ranked in the lowest priority position of the table C 310. The ratings may be collected from other users of the documents over time, and the stored rating may represent an average or median rating of some or all of the users who have rated a document. Table D 312 stores an example comment quantity-based ranking of the documents. In Table D 312, for example, ITEM F is ranked in the highest priority position since it has the most number of comments.

The information in tables 306 and 308 is determined based on the publication history of the exemplary web feed, as shown in tables 302 and 304, and the information in tables 310 and 312 is determined by a ranking generator which collects data from sources other than the feed publisher. Using this information in these tables, the feed publisher may present the documents in a variety or orders, as shown in tables 314 to 326.

Table 314 presents the published documents in reverse chronological order, with the most recently published document (ITEM H) displayed at the top, and the oldest document (ITEM A) displayed at the bottom. A user who views the documents in this order will be assured of seeing the most recently published documents, however, there is no assurance that the displayed documents will be those which are most relevant, or that the most relevant stories will be set apart from the less relevant documents. Since Table A 306 stores the published articles in chronological order, the feed reader may present the documents to the user in chronological order by outputting them as they are already ordered in Table A 306.

Table 316 presents the published documents in high-fidelity ordering mode, ordered according to editorial priority. A user who views the documents in this order will be assured of seeing the most relevant documents (as determined by the feed publisher), however the user is not able to view older stories which are relevant to the user but not the feed publisher. Since Table B 308 stores the currently published documents in their editorial order, the feed reader may present the documents to the user in editorial order by outputting them as they are already ordered in Table B 308.

Table 318 presents the published documents in a first hybrid high-fidelity ordering mode, in which all ranked documents are displayed above a fold, and the remaining unranked documents are displayed below the fold. A user who views the documents in this order will see the most relevant documents (as determined by the feed publisher) first, followed by previously published, but presently unranked documents that may be relevant to the user but not the feed publisher. The feed reader may present the documents to the user in this first hybrid high-fidelity ordering mode by outputting references to the documents listed in Table B 308, in sequence, followed by outputting, in reverse chronological order, references to the documents listed in Table A 306 which are not listed in Table B 308.

Table 320 presents the published documents in a second hybrid high-fidelity ordering mode, in which the top two ranked documents are displayed above a fold, and the remaining published documents are displayed below the fold. A user who views the documents in this order will see some of the most relevant documents first, followed by other documents which may be of interest to the user and the feed publisher. The feed reader may present the documents to the user in this second hybrid high-fidelity ordering mode by outputting references to the first two documents listed in Table B 308, in sequence, followed by outputting, in reverse chronological order, references to the documents listed in Table A 306 and those documents which are not in the top two positions of Table B 308. While, in this example, references to two ranked documents are output above the fold, in other examples references to any positive number of ranked documents can be displayed.

Table 322 presents the published documents in a third hybrid high-fidelity ordering mode, in which the most upward-moving documents is displayed above a fold, and the remaining published documents are displayed below the fold. A user who views the documents in this order will see the documents which is most increasing in relevance first, followed by other documents which may also be of interest to the user and the feed publisher. The feed reader may present the documents to the user in this third hybrid high-fidelity ordering mode by selecting the most upward-moving document from Table B 308 using the techniques described above, and outputting a reference to this document above the fold. Additionally, the feed reader will output, in reverse chronological order, references to the documents listed in Table A 306 and those documents of Table B 308 which were not selected. While, in this example, a reference to the single, most upward-moving ranked document is output above the fold, in other examples references to any positive number of upward-moving documents can be displayed.

Tables 324 and 326 present the published documents in fourth and fifth hybrid high-fidelity ordering modes, respectively, in which the top five highest rated and most commented upon (by past users) documents are displayed above a fold, and the remaining published documents are displayed below the fold. A user who views the documents in this order will see some of the most relevant documents first, as determined by past users and based on two different criteria, followed by other documents which may be of interest to the user and the past users. The feed reader may present the documents to the user in the fourth and fifth hybrid high-fidelity ordering modes by outputting references to the first five documents listed in Table C 310 or Table D 312, in sequence, followed by outputting, in reverse chronological order, references to the documents listed in Table A 306 and those documents which are not in the top five positions of Table C 310 or Table D 312, respectively. While, in these examples, references to five ranked documents are output above the fold, in other examples references to any positive number of ranked documents can be displayed.

Figure 4:
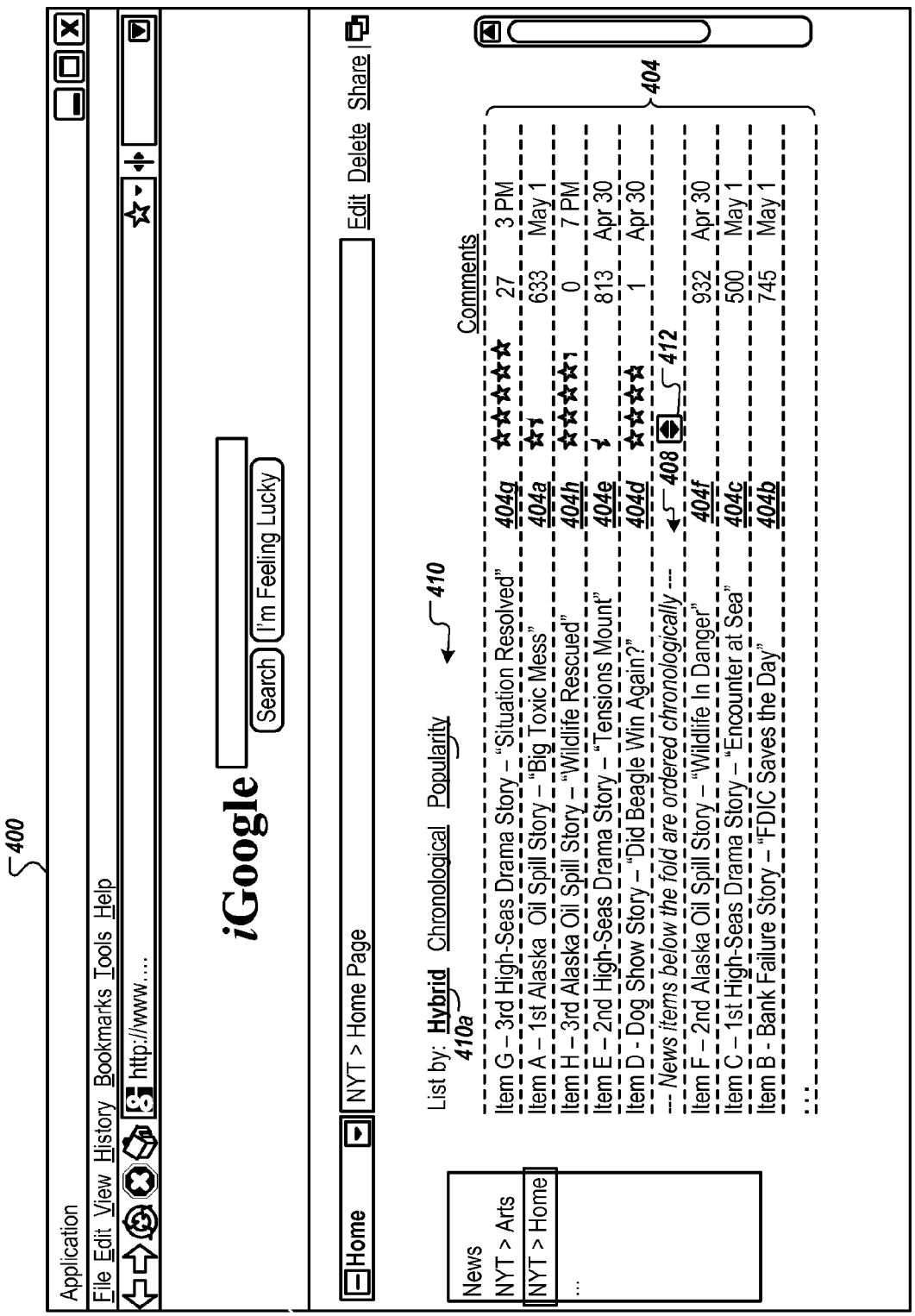
FIGS. 4 and 5 depict exemplary user interfaces.
Figure 5:
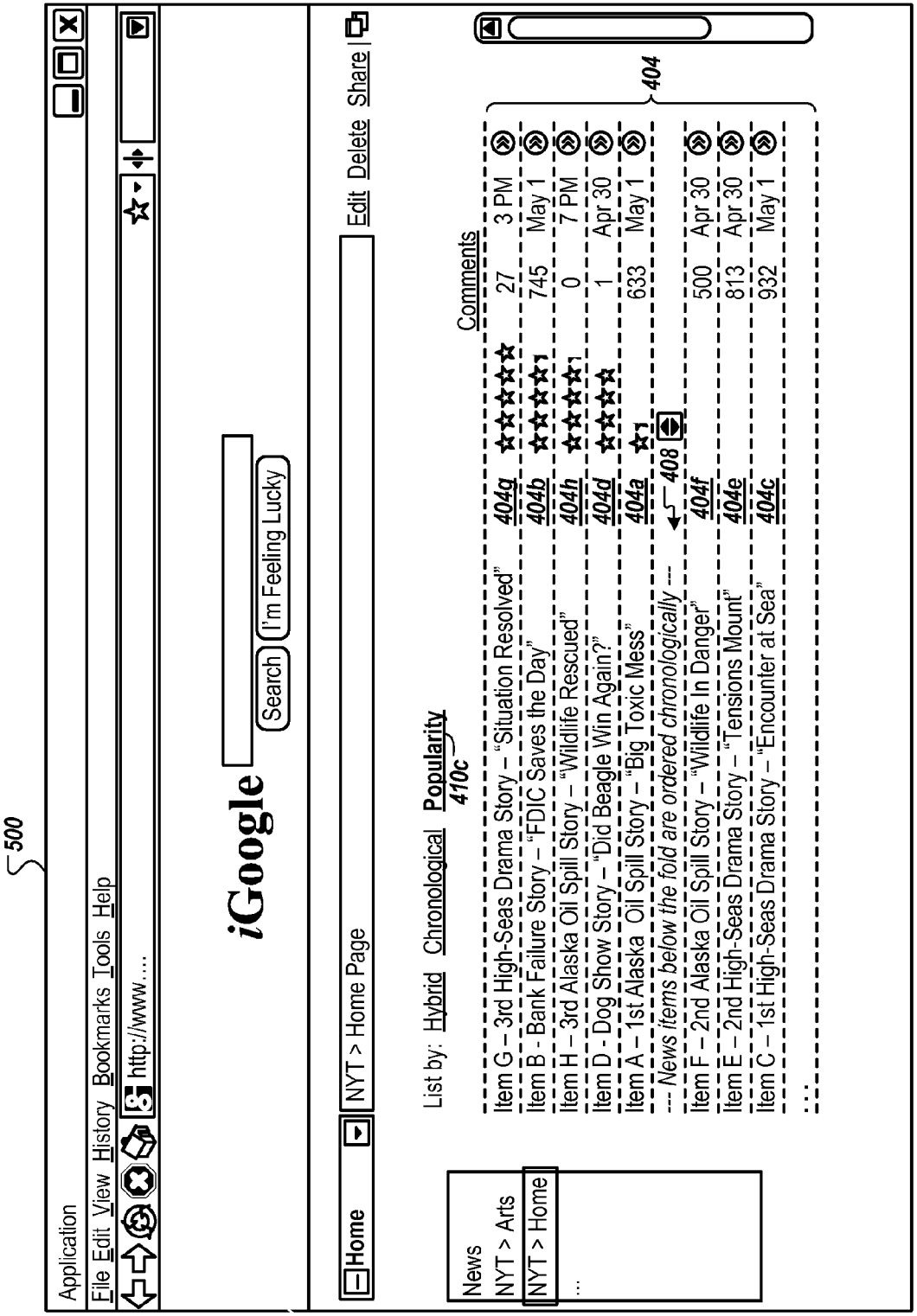

FIGS. 4 and 5 show example user interfaces for displaying links to documents using the first hybrid high-fidelity ordering mode (Table 318) and fourth hybrid high-fidelity ordering mode (Table 324). User interfaces 400 and 500 of FIGS. 4 and 5, respectively, may be displayed on the user's personal computer, smart phone, mobile Internet device, or any other electronic device capable of receiving and displaying web content, including documents from web feeds.

In FIG. 4, the user interface 400 is divided into several areas, including a documents area which displays links 404 to documents that have been published in a web feed. Above the fold 408, the user interface 400 outputs links to the documents that the feed reader has obtained from the web feed at time $t_7$, as ranked by the feed publisher at time $t_7$ (specifically, ITEMS G 404g, ITEM A 404a, ITEM H 404h, ITEM E 404e, and ITEM D 404d, in sequence). Below the fold 408, the user interface outputs links to the documents that the feed reader has obtained from the web feed from time $t_0$ to time $t_7$ which were no longer being published in the web feed at time $t_7$ (specifically, ITEM B 404b; ITEM F 404f; and ITEM C 404c), listed in reverse chronological order. In another implementation, the fold 408 is not displayed, such that a viewer of the user interface cannot visually distinguish between the links to the documents that are currently being published in the web feed, and the links to the documents that are no longer being published in the web feed.

The user interface 400 may also display one or more mode selection links 410, to allow a user to select or switch between a hybrid high-fidelity ordering mode, chronological ordering mode, popularity ordering mode, high-fidelity ordering mode, or other modes. For example, by highlighting link 410a, the user interface 400 indicates that the links 404 are being displayed in hybrid high-fidelity ordering mode The quantity of content-based documents displayed at any particular time may be user selectable. For example, the user may use a text entry field or a slider control adjust the number of ranked documents or unranked documents to display. In other implementations, the user may use a control 412 to adjust the position of the fold 408 and, similarly, the quantity of ranked and unranked documents to display. When a link 404 is selected, the document may be displayed in a separate pop-up window, or in a separate display area in the current window As shown in FIG. 5 the links to the documents are displayed in the user interface 500 using the fourth hybrid high-fidelity ordering mode, after the user selects the "popularity" mode selection link 410c. Above the fold 408, the user interface 500 outputs links to the top five highest rated documents, as determined by a ranking generator based on inputs from other users in the past. The remaining published documents are displayed below the fold 408. The feed reader presents the documents to the user in the fourth hybrid high-fidelity ordering mode by outputting references to the first five documents listed in a user rating-based ranking of the documents (specifically, ITEMS G 404g, ITEM B 404b, ITEM H 404h, ITEM D 404d, and ITEM A 404d, in sequence), followed by outputting, in reverse chronological order, references to the documents that the feed reader has obtained from the web feed from time $t_0$ to time $t_7$ which are not in the top five positions of the user rating-based ranking of the documents (specifically, ITEM F 404*f*; ITEM E 404*e*; and ITEM C 404*c*).

Figure 6:
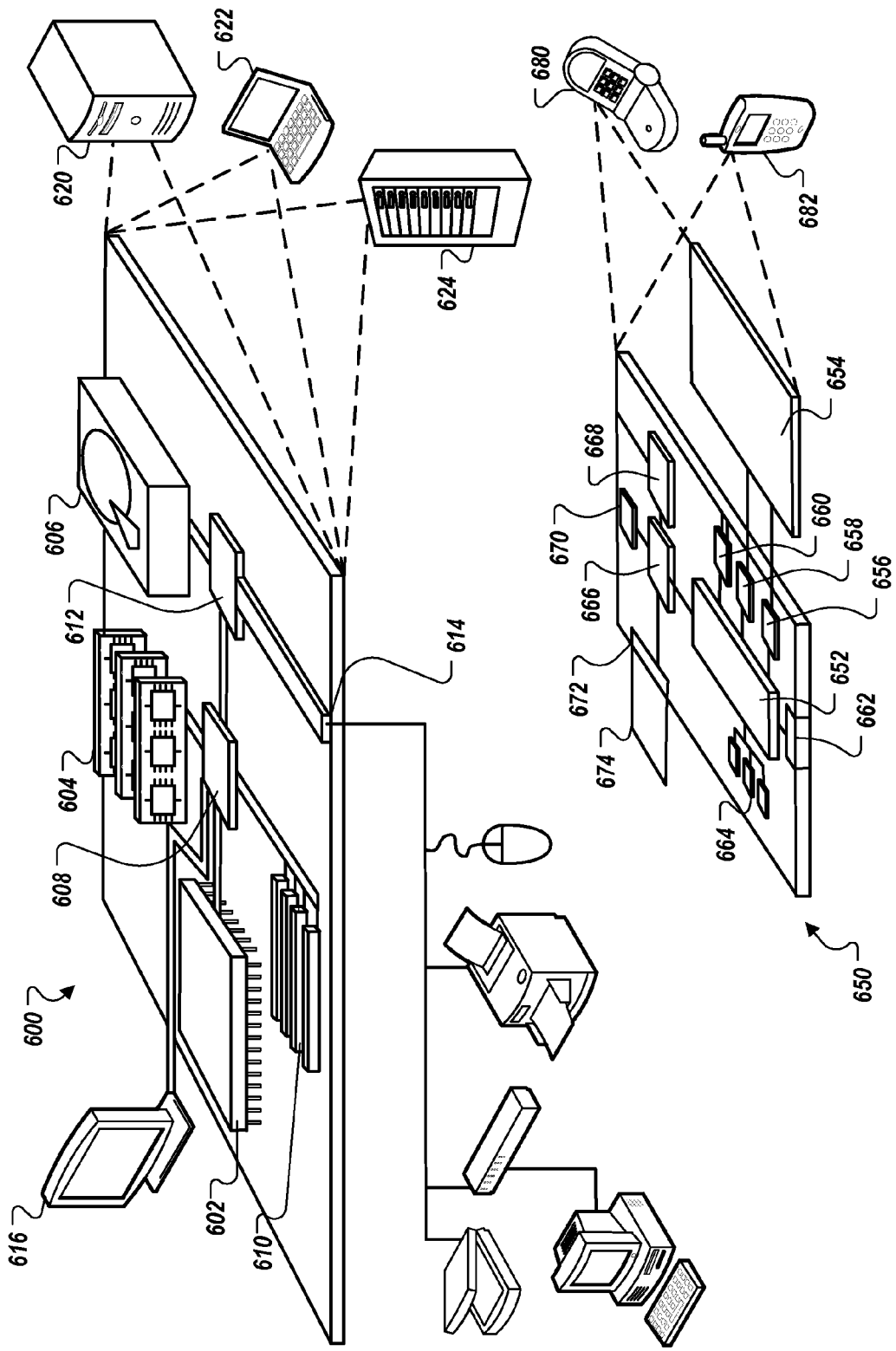
FIG. 6 is a block diagram of an exemplary computing device.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 may process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or a memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 may process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a Thin Film Transistor (TFT) LCD display or an Organic Light-Emitting Diode (OLED) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one example implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communication audibly using audio codec 660, which may receive spoken information from a user and convert it to usable digital information. Audio codex 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms 'machine-readable medium' or 'computer-readable medium' refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The system and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ('LAN'), a wide area network ('WAN"), and the Internet.

An electronic document (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The computing system may include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter described in this specification have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    determining that documents encountered in a most recent check of the web feed are not ranked in chronological order or reverse chronological order by a publisher of the web feed;
    determining that the web feed is an editorially ranked web feed based on determining that the documents encountered in the most recent check of a web feed are not ranked in chronological order or reverse chronological order;
    assigning, as a content-based ranking of a ranked subset of the documents, a ranking based on a degree to which an editorial rank of one or more of the documents of the ranked subset has increased by more than a predetermined threshold amount between a prior check of the web feed and the most recent check of the web feed;
    obtaining in a data processing apparatus one or more lists of the documents that have been published in the web feed, a time that each document was published in the web feed, and the content-based ranking of a ranked subset of the documents, the documents collectively including ranked documents, ranked documents being documents which are members of the ranked subset of the documents, and unranked documents, unranked documents being documents which are not members of the ranked subset of the documents; and
    based on determining that the web feed is an editorially ranked web feed, providing a user interface which displays links to a plurality of the ranked documents, ordered according to the content-based ranking, and which simultaneously displays links to a plurality of the unranked documents, ordered chronologically based on the time that each respective document was published in the web feed,
    wherein the links to the plurality of the ranked documents and the links to the plurality of the unranked documents are displayed as a list in which the links to the plurality of ranked documents and the links to the plurality of unranked documents share a same hierarchical level.

2. The method of claim 1, wherein the links to ranked documents are displayed above the links to the unranked documents.

3. The method of claim 1, wherein links to all of the ranked documents are displayed in the user interface, ordered according to the content-based ranking.

4. The method of claim 1, wherein:
    links to fewer than all of the ranked documents are displayed in the user interface, ordered according to the content-based ranking, and
    links to the unranked documents are displayed in the user interface, ordered chronologically based on the time that each respective document was published in the web feed.

5. The method of claim 1, wherein the one or more lists of documents are stored by a search engine.

6. The method of claim 1, wherein the time that each document was published in the web feed further comprises the time that each document was first published in the web feed.

7. The method of claim 1, wherein the content-based ranking comprises a non-chronological ranking.

8. The method of claim 1, wherein the user interface displays the links to the plurality of the ranked documents, ordered according to the content-based ranking, and separately and simultaneously displays the links to the plurality of the unranked documents, ordered chronologically based on the time that each respective document was published in the web feed.

9. The method of claim 1, wherein the links to the plurality of the ranked documents are separated by a fold from the links to the plurality of the unranked documents, on the list.

10. A system comprising:
    one or more computers; and
    a computer-readable medium coupled to the one or more computers having instructions stored thereon which, when executed by the one or more computers, cause the one or more computers to perform operations comprising:
    determining that documents encountered in a most recent check of a web feed are not ranked in chronological order or reverse chronological order by a publisher of the web feed;
    determining that the web feed is an editorially ranked web feed based on determining that the documents encountered in the most recent check of the web feed are not ranked in chronological order or reverse chronological order;

assigning, as a content-based ranking of a ranked subset of the documents, a ranking based on a degree to which an editorial rank of one or more of the documents of the ranked subset has increased by more than a predetermined threshold amount between a prior check of the web feed and the most recent check of the web feed;

obtaining one or more lists of the documents that have been published in the web feed, a time that each document was published in the web feed, and the content-based ranking of a ranked subset of the documents, the documents collectively including ranked documents, ranked documents being documents which are members of the ranked subset of the documents, and unranked documents, unranked documents being documents which are not members of the ranked subset of the documents; and based on determining that the web feed is an editorially ranked web feed, providing a user interface which displays links to a plurality of the ranked documents, ordered according to the content-based ranking, and which simultaneously displays links to a plurality of the unranked documents, ordered chronologically based on the time that each respective document was published in the web feed, wherein the links to the plurality of the ranked documents and the links to the plurality of the unranked documents are displayed as a list in which the links to the plurality of ranked documents and the links to the plurality of unranked documents share a same hierarchical level.

11. The system of claim 10, wherein:

the one or more computers comprise a client and a server, and providing the user interface further comprises generating, by the client, the user interface using the one or more lists of the documents obtained by the client device from the server.

12. The system of claim 10, wherein:

the one or more computers comprise a client and a server, and providing the user interface further comprises generating, by the server, data which, when transmitted over a network and invoked by the client, causes the client to generate the user interface, the server generating the code using the one or more lists of the documents obtained by the server.

13. The system of claim 10, wherein:

the one or more computers comprise a client and a server, and providing the user interface comprises generating, by the client, the user interface using the one or more lists of the document obtained by the server.

14. The system of claim 10, wherein the links to the plurality of the ranked documents are separated by a fold from the links to the plurality of the unranked documents, on the list.

15. A computer storage medium encoded with a computer program, the program comprising instructions that when executed by a data processing apparatus cause the data processing apparatus to perform operations comprising:

determining that documents encountered in a most recent check of a web feed are not ranked in chronological order or reverse chronological order by a publisher of the web feed;

determining that the web feed is an editorially ranked web feed based on determining that the documents encountered in the most recent check of the web feed are not ranked in chronological order or reverse chronological order;

assigning, as a content-based ranking of a ranked subset of the documents, a ranking based on a degree to which an editorial rank of one or more of the documents of the ranked subset has increased by more than a predetermined threshold amount between a prior check of the web feed and the most recent check of the web feed;

obtaining one or more lists of the documents that have been published in the web feed, a time that each document was published in the web feed, and the content-based ranking of a ranked subset of the documents, the documents collectively including ranked documents, ranked documents being documents which are members of the ranked subset of the documents, and unranked documents, unranked documents being documents which are not members of the ranked subset of the documents; and based on determining that the web feed is an editorially ranked web feed, providing a user interface which displays links to a plurality of the ranked documents, ordered according to the content-based ranking, and which simultaneously displays links to a plurality of the unranked documents, ordered chronologically based on the time that each respective document was published in the web feed, wherein the links to the plurality of the ranked documents and the links to the plurality of the unranked documents are displayed as a list in which the links to the plurality of ranked documents and the links to the plurality of unranked documents share a same hierarchical level.

16. The computer storage medium of claim 15, wherein the links to the plurality of the ranked documents are separated by a fold from the links to the plurality of the unranked documents, on the list.

\* \* \* \* \*